(12) United States Patent
Wolf et al.

(10) Patent No.: US 7,545,125 B2
(45) Date of Patent: Jun. 9, 2009

(54) GENERATOR FOR A MOTOR VEHICLE HAVING A B12 RECTIFIER

(75) Inventors: Gert Wolf, Affalterbach (DE); Klaus Rechberger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/871,649

(22) Filed: Jun. 17, 2004

(65) Prior Publication Data
US 2005/0012479 A1      Jan. 20, 2005

(30) Foreign Application Priority Data
Jun. 20, 2003   (DE) ................................ 103 27 689

(51) Int. Cl.
*H02P 9/00*        (2006.01)
*H02P 1/32*        (2006.01)

(52) U.S. Cl. .............................. 322/90; 322/62; 322/63; 310/179; 310/184; 318/771

(58) Field of Classification Search .................. 322/58, 322/86, 89, 90, 62, 20, 46, 51, 52; 318/771; 310/179, 198
See application file for complete search history.

(56) References Cited

U.S. PATENT DOCUMENTS

| 3,638,094 A | * | 1/1972 | Ve Nard, II | .................... 363/43 |
|---|---|---|---|---|
| 3,702,964 A | * | 11/1972 | Kudlacik et al. | ............... 322/59 |
| 3,864,667 A | | 2/1975 | Bahjat | |
| 3,944,919 A | * | 3/1976 | Jewell et al. | ................. 324/107 |
| 4,156,185 A | * | 5/1979 | Kelley et al. | ................. 324/107 |
| 4,163,187 A | * | 7/1979 | Thomas | ....................... 322/29 |
| 4,477,767 A | * | 10/1984 | Cotzas | ......................... 322/59 |
| 5,274,322 A | | 12/1993 | Hay | |
| 5,444,355 A | * | 8/1995 | Kaneyuki et al. | .............. 322/58 |
| 5,455,500 A | * | 10/1995 | Shichijyo et al. | .............. 322/90 |
| 6,703,747 B2 | * | 3/2004 | Kawamura | ................... 310/179 |
| 6,864,667 B2 | * | 3/2005 | Buening et al. | ............... 322/90 |
| 2002/0093266 A1 | * | 7/2002 | Buening et al. | ............. 310/198 |

FOREIGN PATENT DOCUMENTS

FR          2 737 063          1/1997

OTHER PUBLICATIONS

Harmonics Guide, 2000, Control Techniques.
Guide to Harmonics With AC Drives, 2000, ABB Automation Group Ltd.

* cited by examiner

*Primary Examiner*—T C Patel
*Assistant Examiner*—Eduardo Colon-Santana
(74) *Attorney, Agent, or Firm*—Kenyon & Kenyon LLP

(57) ABSTRACT

The present invention relates to a six-phase generator for a motor vehicle having two three-phase systems displaced with respect to one another by 30°, the phase windings of one of the three-phase systems being positioned in a wye connection and the phase windings of the other three-phase system being positioned in a delta connection.

7 Claims, 3 Drawing Sheets

GENERATOR STATOR SLOT

GENERATOR FOR A MOTOR VEHICLE HAVING A B12 RECTIFIER

BACKGROUND INFORMATION

It is known to configure motor vehicle generators as three-phase machines having a B6 bridge rectifier. The phase windings of a three-phase machine are wye-connected. If the number of pole pairs is p=8, the number n of the stator slots is calculated as follows:

$n=2{\times}p{\times}3$ phases=48.

Furthermore, a generator distributed by Denso is also known, which is a generator having a real six-phase system and a B12 bridge rectifier. The advantage of this known generator is noise reduction and the reduced voltage ripple after rectification. Compared to known generators configured as three-phase machines, this six-phase system requires twice the number of stator slots. If the number of pole pairs of the generator having a six-phase system is p=8, and if the six phases are double wye-connected, the number n of the stator slots is calculated as follows:

$n=2{\times}p{\times}6$ phases=96.

A generator having a six-phase system is shown in FIG. 1. The phase windings of this system are situated in different slots. The generator shown here has two parallel three-phase wye connections, each connected to a B6 bridge rectifier. The plus outputs of the two B6 bridge rectifiers come together and form one output B+. The minus outputs of the two B6 bridge rectifiers also come together and form one output B−. The phase angle between the two wye connections is 30°. Therefore, the generator is made up of two three-phase systems, each forming a three-phase wye connection, a phase angle of 30° being between the two wye connections.

SUMMARY OF THE INVENTION

A generator according to the present invention makes possible a 12-pulse rectification by using two three-phase systems, the windings of one of the three-phase phase systems being wye-connected, and the windings of the other three-phase system being delta-connected. This does not increase the number of necessary stator slots compared to known three-phase systems, since the phase windings are placed in the same slots and are only wired differently. Still, a generator according to the present invention forms a six-phase system having a B12 rectifier.

The combination according to the present invention of a wye connection and a delta connection results in two three-phase systems displaced with respect to one another by 30°. Combining each of the two three-phase systems with a B6 bridge rectifier results in a 12-pulse direct current having reduced voltage ripple compared to known three-phase systems. Furthermore, a generator having the features according to the present invention has reduced interference noise compared to known three-phase systems.

DETAILED DESCRIPTION

Figure 1:
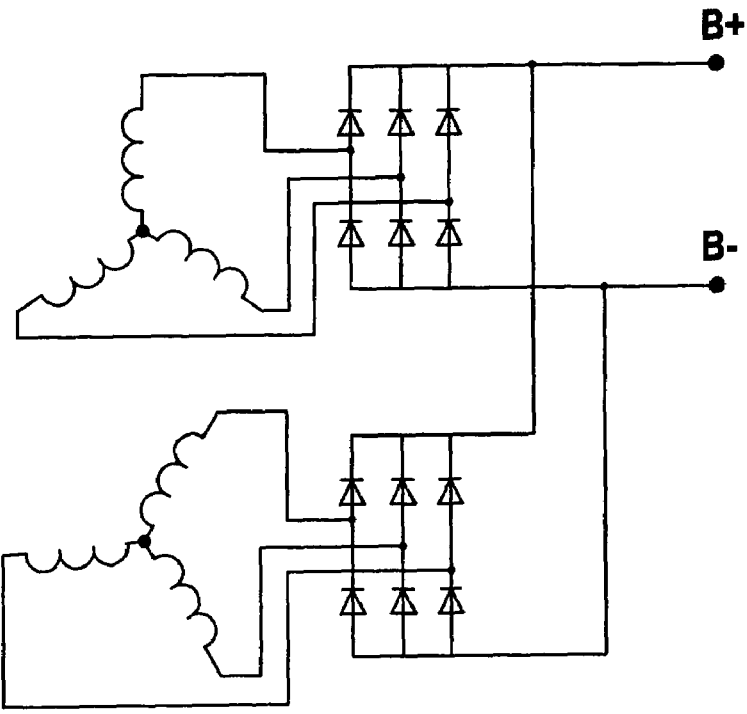
FIG. 1 shows a generator having a six-phase system and a B12 bridge rectifier according to the related art.
Figure 2:
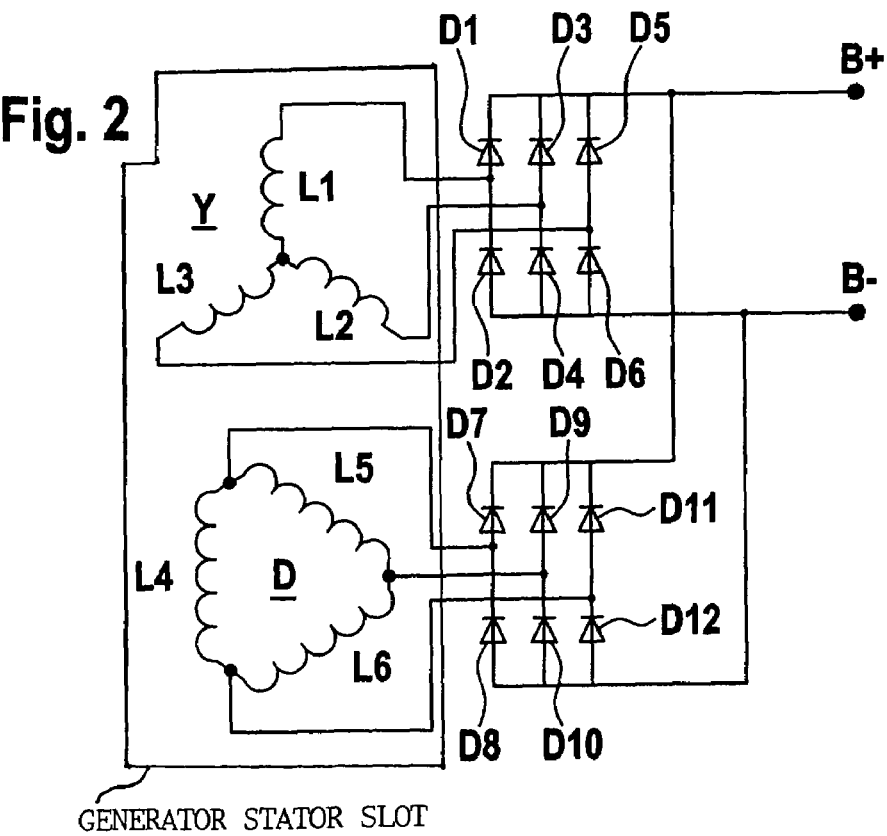
FIG. 2 shows a generator having a six-phase system and a B12 bridge rectifier according to the present invention.

FIG. 2 shows a generator having a six-phase system and a B12 bridge rectifier according to the present invention. The six-phase system has a first three-phase system Y and a second three-phase system D.

First three-phase system Y has phase windings L1, L2, and L3 wired in wye connection. The terminal of phase winding L1, situated at a distance from the wye point of the wye connection, is connected to a connection point lying between the anode of a diode D1 and the cathode of a diode D2. The terminal of phase winding L2, situated at a distance from the wye point of the wye connection, is connected to a connection point lying between the anode of a diode D3 and the cathode of a diode D4. The terminal of phase winding L3, situated at a distance from the wye point of the wye connection, is connected to a connection point lying between the anode of the diode D5 and the cathode of the diode D6. The cathodes of diodes D1, D3, and D5 are joined and connected to output B+ of the device shown. The anodes of diodes D2, D4, and D6 are also joined and connected to output B− of the device shown. Diodes D1-D6 form a B6 rectifier for the phase currents, offset from each other by 120° and provided by first three-phase system Y.

Second three-phase system D has phase windings L4, L5, and L6 wired in a delta connection. The terminal of the delta connection, lying between phase windings L4 and L5, is connected to a connection point lying between the anode of a diode D7 and the cathode of a diode D8. The terminal of the delta connection, lying between phase windings L5 and L6, is connected to a connection point lying between the anode of a diode D9 and the cathode of a diode D10. The terminal of the delta connection, lying between phase windings L4 and L6, is connected to a connection point lying between the anode of a diode D11 and the cathode of a diode D12. The cathodes of diodes D7, D9, and D11 are joined and connected to output B+ of the device shown. The anodes of diodes D8, D10, and D12 are also joined and connected to output B− of the device shown. Diodes D7-D12 form a B6 rectifier for the phase currents, offset from each other by 120° and provided by a second three-phase system D.

Figure 3:
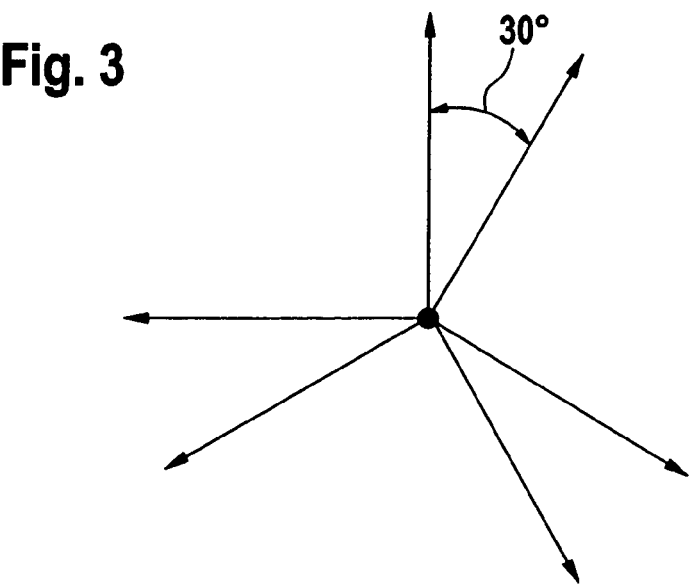
FIG. 3 illustrates the phase voltages occurring in a generator according to FIG. 2.

As shown in FIG. 3, the phase voltages whose phase angles are designated as $\phi_Y$, provided by the wye connection, are displaced by 30° with respect to the phase voltages whose phase angles are designated as $\phi_D$, provided by the delta connection.

The combination shown in FIG. 2 of two B6 bridge rectifiers generates a 12-pulse direct current from the phase voltages provided by the generator. Compared to direct currents generated by a three-phase generator having a B6 bridge rectifier, this direct current has a lower ripple content.

Figure 4:
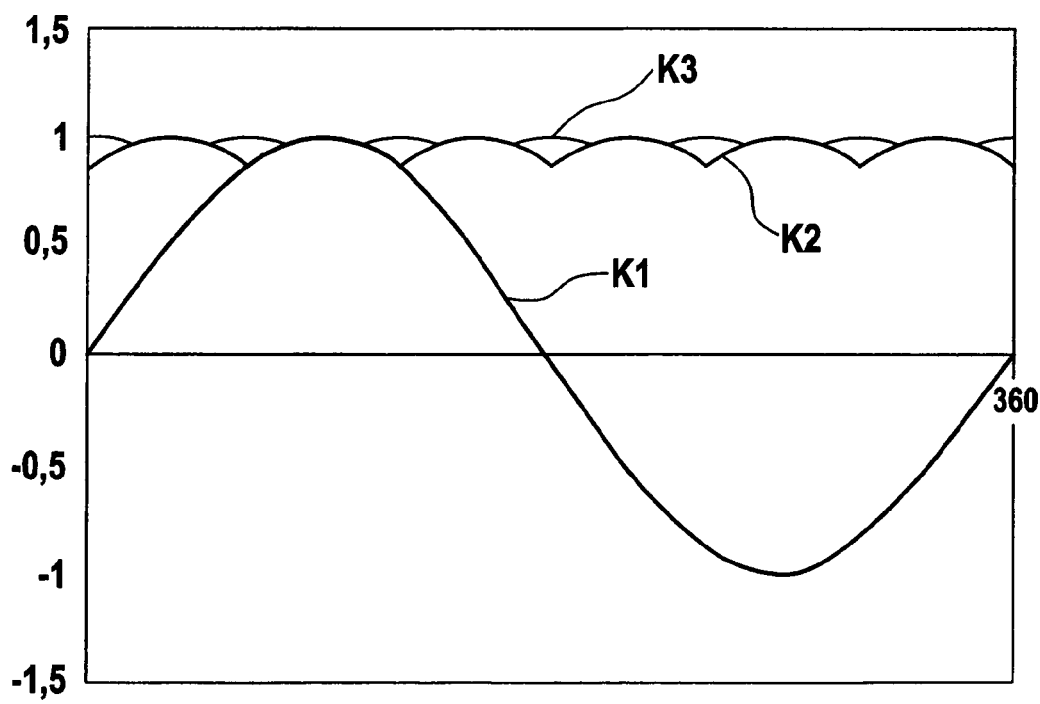
FIG. 4 shows the ripple content of the output voltage of a generator having B12 rectification according to the present invention in comparison with a known generator having B6 rectification.

This is illustrated in FIG. 4, where the electrical angle is applied along the abscissa, and the voltage is applied along the ordinate. Curve K1 corresponds to a complete period of alternating voltage. Curve K2 shows the output direct voltage provided by a B6 rectifier. Curve K3 shows the output direct voltage as provided by a B12 rectifier according to the present invention. The output voltage provided by a B6 rectifier has a ripple content of 4.2%, whereas the output voltage provided by a B12 rectifier has a ripple content of only 1.04%. Ripple is understood to mean the ratio between the rms-value of the superimposed alternating voltage and the mean direct voltage.

In the case of a generator according to the present invention, the phase windings associated with the two three-phase systems may each be housed in the same stator slots, requiring the numbers of turns and the wire cross-sections of the wye and delta connection phase windings to be adjusted to one another.

Possible combinations for the numbers of turns per pole pair in a generator are:

| Wye Connection | Delta Connection |
|---|---|
| 3 | 5 |
| 4 | 7 |
| 6 | 10 |

The above-mentioned numbers of turns of the wye and delta connections differ by a factor of 1.73.

This means that instead of a connection having five conductors per slot as in the case of known delta connections, where each of these conductors has two wires connected in parallel, one slot for the delta connection is now able to accept a connection having five conductors, each of these conductors has only one wire, and additionally three conductors for the wye connection, where each of these conductors also has only one wire.

The coils are interconnected either on the winding head or on the rectifier that is made up of two B6 bridge connections. Both systems are joined on the direct-current side. Since the turn number ratio is not exactly a whole number, the delta and wye connections are subject to slightly uneven loads during operation. This fact must be taken into consideration when configuring the winding, in particular by a suitable choice of the wire cross-sections of the windings.

As can be seen in FIG. 2, the rectifier shown there has a total of 12 rectifier diodes. This does not represent a disadvantage compared to conventional high-capacity generators, since in high-capacity generators two parallel diodes are used per bridge arm, i.e., a total of 6×2=12 diodes, in order to preserve the required current carrying capacity.

Figure 5:
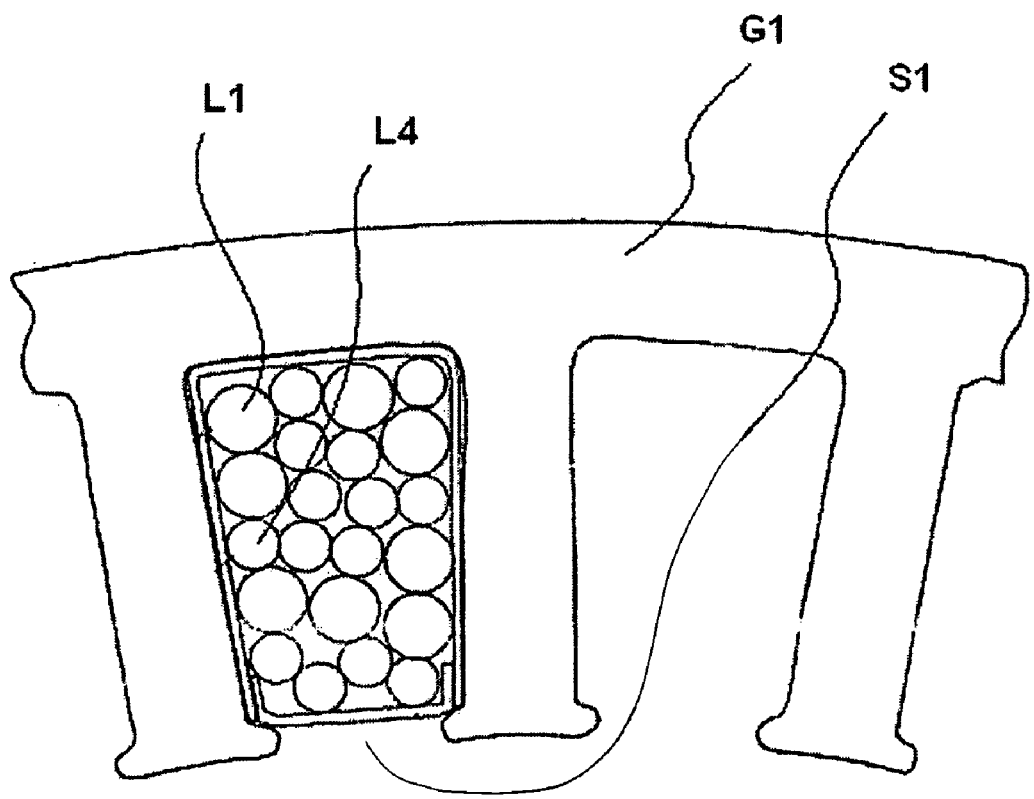
FIG. 5 shows a generator stator having a slot containing wires of phase windings according to the present invention.

As shown in FIG. 5, the phase windings L1 and L4, for example, are housed in the generator stator G1 having slot S1. A significant advantage of a generator according to the present invention is that the advantages of a B12 rectifier connection may be used without having to increase the number of required stator slots compared to a machine having a B6 rectifier. In addition, a generator according to the present invention also has the advantage of a reduced ripple content of the output voltage provided by the rectifier, and reduced interference noise.

What is claimed is:

1. A six-phase generator for a motor vehicle, comprising:
   a generator stator including a slot;
   a first three-phase system including first phase windings, the first phase windings being situated in a wye connection, wherein one of the first phase windings is housed in the slot of the generator stator; and
   a second three-phase system displaced with respect to the first three-phase system, the second three-phase system including second phase windings, the second phase windings being situated in a delta connection, wherein one of the second phase windings is housed in the slot of the generator stator in which the one of the first phase windings is housed, so that no additional slot is necessary to accommodate said one of the second phase windings.

2. The generator according to claim 1, wherein the first and second three-phase systems include first and second B6 rectifier bridges, respectively, connected downstream.

3. The generator according to claim 2, wherein the first and second B6 rectifier bridges are joined to each other on their direct-current sides.

4. The generator according to claim 2, wherein an interconnection of the phase windings is on the rectifier bridges.

5. The generator according to claim 1, wherein numbers of turns and wire cross-sections of the phase windings of the wye connection and the delta connection are adjusted to each other.

6. The generator according to claim 1, wherein an interconnection of the phase windings is on a winding head.

7. The generator according to claim 1, wherein the second three-phase system is displaced by 30 degrees relative to the first three-phase system.

* * * * *